April 2, 1957    H. WINGEN    2,787,059
HANDLE FOR HUNTING KNIVES
Filed July 20, 1955

United States Patent Office 2,787,059
Patented Apr. 2, 1957

2,787,059

HANDLE FOR HUNTING KNIVES

Heinz Wingen, Solingen, Germany, assignor, by mesne assignments, to Robeson Cutlery Company, Inc., Perry, N. Y., a corporation of New York Application July 20, 1955, Serial No. 523,322

4 Claims. (Cl. 30—342)

This invention relates to a handle construction for knives, particularly of the kind known as hunting knives.

An object of the invention is the provision of a generally improved and more satisfactory knife handle.

Another object is the provision of a knife handle which will remain tight on the tang of the knife blade, even after long continued dryness, and which also will have the desired thickness or body to give it the proper feel in the hand of the user.

Still another object is the provision of a knife handle of the type having side plates of horn (either natural or artificial), the handle being so designed and constructed that horn of moderate thickness may be used in producing a handle of relatively great thickness to have the proper feel, without requiring a thick tang of the knife blade.

These and other desirable objects may be attained in the manner disclosed as an illustrative embodiment of the invention in the following description and in the accompanying drawings forming a part hereof, in which.

The same reference numerals throughout the several views indicate the same parts.

In one type of horn handle for hunting knives, as heretofore constructed, the handle is made of a tubular piece of so-called stag or horn, and the tang of the metal blade extends longitudinally through the handle, the handle being held tight to the blade by means of a compression nut on the rear end of the tang. The difficulty with this type of handle is that when the stag horn becomes thoroughly dried out (as for example by long continued storage on the shelf of a store) it contracts slightly in length, relieving the endwise pressure of the clamping nut and thereby making the handle relatively loose and unsatisfactory.

A more satisfactory handle, so far as liability to looseness is concerned, is one made by using flat side plates of stag horn, rather than a tubular piece of stag horn. But if the side plates are made of material of only moderate thickness and are laid against a tang which is of the same thickness as the knife blade itself, then the handle is too thin and does not have the proper feel in the hand of the user. If the tang is made thicker in order to increase the thickness of the assembled handle while still using horn plates of moderate thickness, then the extra thickness of the tang (if it is made integral with the steel of the knife blade itself) requires the use of an excessively thick piece of metal for forming the blade. Since the steel of which the blade is made is relatively high grade and expensive, the increased thickness required by the use of an abnormally thick tang is wasteful and expensive.

These difficulties are overcome according to the present invention, by applying the horn plates not directly to the tang of the blade itself, but to a separate frame or holder which is firmly secured to the tang and which is thicker than the tang, thus giving sufficient thickness to the completed handle, while allowing the use of horn plates of moderate thickness and allowing the use of a tang no thicker than the normal thickness of metal from which the blade is made.

Figure 6:
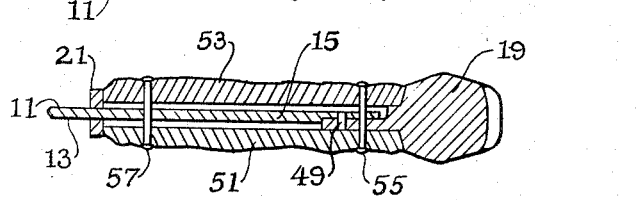
Fig. 6 is a horizontal section taken substantially on the line 6—6 of Fig. 1.

Referring now to the drawings, the blade is indicated in general at 11, having a butt or heel portion 13 from which an integral tang 15 projects, the tang being no thicker than and preferably the same thickness as the butt or heel portion 13 of the blade, as best seen in Fig. 6.

Figure 1:
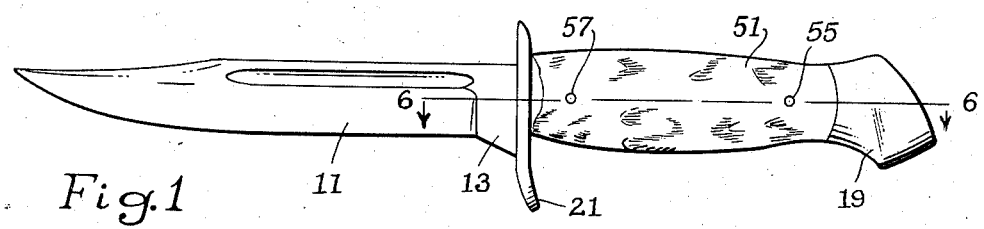
Fig. 1 is a side elevation of a knife in accordance with a preferred embodiment of the invention.
Figure 2:
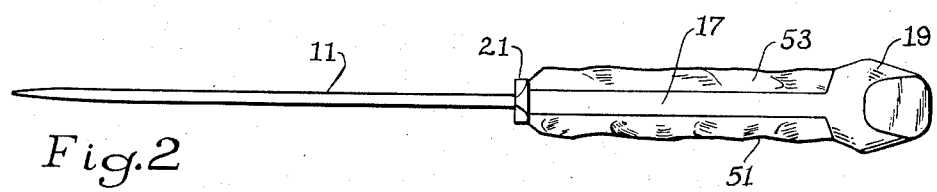
Fig. 2 is a top plan or edge view thereof.
Figure 3:
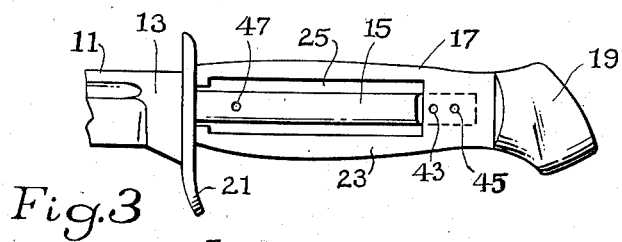
Fig. 3 is a view of the handle portion of the knife shown in Fig. 1, with the side plates removed.
Figure 4:
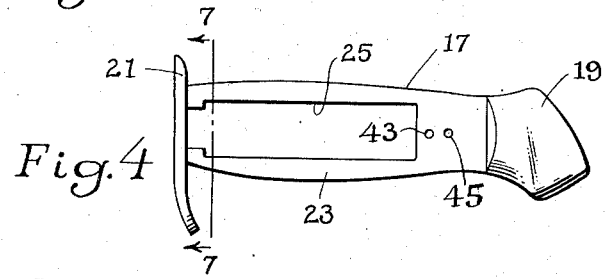
Fig. 4 is a side elevation of the side plate frame or holder, with the side plates and the knife blade removed.
Figure 5:
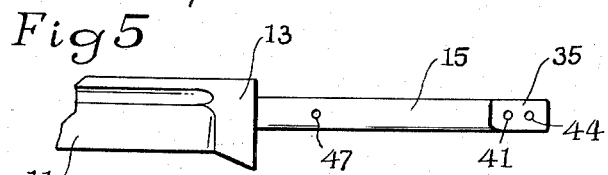
Fig. 5 is a side elevation of the rear end of the knife blade and its tang, removed from other parts.

A metal frame indicated in general at 17, best shown separately in Fig. 4, is made of metal of lower or cheaper grade than that used in the blade, integrally cast, or formed of separate pieces of metal welded to each other, as desired. It has a thick butt end 19, a guard portion 21 which is thicker than the knife blade 11, 13, and a horn plate receiving portion 23 which extends from the thickened butt 19 to the guard 21 and which has opposite faces which are substantially plane and parallel to each other, the thickness of the part 23 being substantially greater than the thickness of the knife blade 11, 13.

Figure 7:
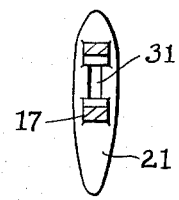
Fig. 7 is a cross section taken substantially on the line 7—7 of Fig. 4.
Figure 8:
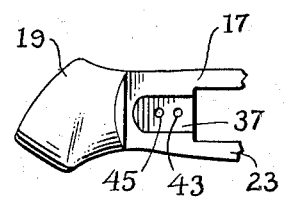
Fig. 8 is a fragmentary side view of the rear part of the construction shown in Fig. 4, viewed from the opposite side.

An opening 25 is cut through the main flat portion 23 of the frame, as seen in Fig. 4. The guard 21 is provided with an opening 31 (see Fig. 7) of the right size so that the tang 15 may extend through this opening 31, the size of the opening being such that the tang makes a relatively tight or snug sliding fit in the opening, at least when the tang reaches the normally assembled or home position.

At the rear end of the tang 15, part of the thickness is cut away, through a limited area, to provide a thinned portion 35 which, when the parts are assembled, overlaps and mates with a thinned portion 37 of the frame 17. A rivet hole 41 in the tang is alined with a rivet hole 43 in the frame 17, when the parts are assembled, and a second rivet hole 44 in the tang is alined with a second rivet hole 45 in the frame. The tang also contains a third rivet hole 47. A rivet 49 extends through the alined holes 41 and 43 when the parts are assembled.

The side plates of stag horn, either natural or artificial, are shown respectively at 51 and 53. These side plates have the usual roughened or irregular outer faces, and smooth flat inner faces which rest firmly against the parallel flat faces of the portion 23 of the frame 17, and are held in place by the rivets 55 and 57, the former passing through the openings 44 and 45 in the tang 15 and frame 17, respectively, and the latter passing through the opening 47 in the tang 15, so that all parts are snugly and securely fastened to each other. After long continued drying, the stag horn may perhaps contract slightly in length, but this will not loosen the horn plates from the knife because the length of the horn plates is not relied upon to keep them tight. Any contraction due to drying is so insignificant, in the direction of thickness of the horn plates, that no looseness of the rivets results.

In assembling the knife, the tang 15 of the knife blade is inserted longitudinally through the opening 31 in the guard portion 21 of the frame 17, and is brought to a position where the rivet hole 41 is alined with the rivet hole 43. Then the rivet 49 is inserted through these alined holes 41 and 43. Then the side plates 51 and 53 are applied, and the rivets 55 and 57 are inserted and are upset or riveted at their ends, to hold the stag horn plates firmly. The rivet 55 serves the additional function of fastening the parts 15 and 17 to each other as an extra precaution, so that reliance is not placed on the rivet 49 alone.

With this construction, the side plate receiving portion 23 of the frame 17 may be made as thick as desired, thus enabling the production of a desirable thick handle without employing an excessively thick piece of high grade cutlery steel, and without requiring the use of excessively thick horn plates 51 and 53. If thinner horn is available more cheaply than thicker horn, it can easily be accommodated by making the frame 17 somewhat thicker, without in any way changing the construction of the knife blade 11, 13 itself, or the tang 15, these parts 11, 13, and 15 being the parts made of high grade and expensive steel, while the metal frame 17 is of relatively inexpensive metal.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A hunting knife comprising a blade portion and an elongated tang portion integral with the blade portion and extending in substantially the same direction as the blade portion and formed of metal no thicker than the maximum thickness of the blade portion, a handle frame secured in fixed position relative to said tang portion and formed of metal, said frame being separate from said blade and tang portions and including a frame plate thicker than said tang portion and having a thickened butt at the end remote from said blade portion and a thickened guard at the end adjacent said blade portion, said guard being formed with an opening snugly embracing said tang portion, said frame plate being formed with an elongated through opening for receiving the major part of the length of said tang portion, a minor part of the length of said tang portion overlapping a part of said frame plate, a pair of handle side plates mounted on opposite sides of said frame plate between said thickened butt and said thickened guard in position to enclose said tang portion between said side plates, and a plurality of rivets extending laterally through both of said side plates and tending to draw said side plates toward each other and to maintain them tightly engaged with said frame plate.

2. A construction as defined in claim 1, in which one of said rivets passes through both said frame plates and said tang portion in the region where they overlap each other, and another of said rivets passes through said tang portion at a point substantially spaced from said first mentioned rivet.

3. A knife including a blade and a tang integral with each other, a handle frame mounted on said tang in fixed position relative thereto, said handle frame including means forming flat planar areas on two opposite faces of said frame and arranged with the planes thereof substantially parallel to each other and spaced from each other by a distance greater than the thickness of said tang, a pair of horn handle side plates mounted on opposite sides of said frame and seated on said planar areas thereof, and a plurality of fastening members spaced from each other in a direction lengthwise of said tang and extending laterally through said side plates and tang, to secure said side plates immovably to said tang, said tang being elongated, said handle frame having a tang-receiving recess extending through more than half the length but less than the full length of the tang, said tang being in overlapping contact with said frame throughout a minor portion of the length of said tang and being out of contact with said frame throughout a major portion of the length of said tang.

4. A construction as defined in claim 3, further including a fastening pin connecting the overlapping parts of said tang and frame to each other, in a position spaced from said fastening members which extend through said side plates.

References Cited in the file of this patent

FOREIGN PATENTS

| 10,473 | Great Britain | Sept. 4, 1885 |
| 12,371 | Great Britain | Aug. 7, 1890 |
| 15,662 | Great Britain | Aug. 17, 1894 |
| 256,500 | Great Britain | Feb. 16, 1949 |